(12) United States Patent  
Dollard

(10) Patent No.: US 6,934,340 B1  
(45) Date of Patent: Aug. 23, 2005

(54) ADAPTIVE CONTROL SYSTEM FOR INTERFERENCE REJECTIONS IN A WIRELESS COMMUNICATIONS SYSTEM

(75) Inventor: Michael S. Dollard, Brecksville, OH (US)

(73) Assignee: Cisco Technology, Inc., San Jose, CA (US)

( * ) Notice: Subject to any disclaimer, the term of this patent is extended or adjusted under 35 U.S.C. 154(b) by 795 days.

(21) Appl. No.: 09/812,260

(22) Filed: Mar. 19, 2001

(51) Int. Cl.[7] ............................................. H04L 27/28
(52) U.S. Cl. ...................................... 375/260; 455/450
(58) Field of Search ................................ 375/219, 222, 375/260; 370/203, 206, 207, 208, 241, 252; 455/59, 500, 501, 450, 452.1, 452.2

(56) References Cited

U.S. PATENT DOCUMENTS

| 5,991,269 A | * | 11/1999 | Williamson et al. | ......... 375/222 |
| 6,721,569 B1 | * | 4/2004 | Hashem et al. | ............. 455/450 |
| 2002/0119781 A1 | * | 8/2002 | Li et al. | ..................... 455/450 |

* cited by examiner

Primary Examiner—Betsy L. Deppe  
(74) Attorney, Agent, or Firm—Tucker Ellis & West LLP

(57) ABSTRACT

An adaptive control system for controlling the effects of narrow to medium bandwidth interferers in a wireless communications system (e.g., wireless LAN devices) by identifying which sub-carriers in a multi-carrier system are located on frequencies that are subject to interfering signals, and using only those sub-carriers that are not subject to interference for communications between wireless communications devices.

40 Claims, 4 Drawing Sheets

SUBCARRIER NUMBER:

| 1 | 2 | 3 | 4 | 5 | 6 | 7 | 8 | 9 | 10 | 11 | 12 | 13 | 14 |
|---|---|---|---|---|---|---|---|---|----|----|----|----|----|
|0,1|2,3|4,5|6,7|8,9|10,11|0,1|2,3|4,5|6,7|8,9|10,11|0,1|2,3|

OFDM SYMBOL 1

| 41 | 42 | 43 | 44 | 45 | 46 | 47 | 48 |
|----|----|----|----|----|----|----|----|
|8,9|10,11|0,1|2,3|4,5|6,7|8,9|10,11|

*Fig. 6A*

SUBCARRIER NUMBER:

| 1 | 2 | 3 | 4 | 5 | 6 | 7 | 8 | 9 | 10 | 11 | 12 | 13 | 14 |
|---|---|---|---|---|---|---|---|---|----|----|----|----|----|
|12,13|14,15|16,17|18,19|20,21|22,23|12,13|14,15|16,17|18,19|20,21|22,23|12,13|14,15|

OFDM SYMBOL 2

| 41 | 42 | 43 | 44 | 45 | 46 | 47 | 48 |
|----|----|----|----|----|----|----|----|
|20,21|22,23|12,13|14,15|16,17|18,19|20,21|22,23|

*Fig. 6B*

ADAPTIVE CONTROL SYSTEM FOR INTERFERENCE REJECTIONS IN A WIRELESS COMMUNICATIONS SYSTEM

FIELD OF INVENTION

The present invention generally relates to a method for controlling the effects of interference in a wireless communications system, and more particularly to an adaptive control system for limiting the effects of interference due to "narrow" and "medium" bandwidth signals in a wireless communications system (e.g., wireless LAN devices) using a multicarrier modulation techniques.

BACKGROUND OF THE INVENTION

In a wireless communication system there is always the potential of interfering signals that may corrupt a desired signal. This is especially true in the unlicensed ISM (Industrial, Scientific and Medical) and UNII (Unlicensed National Information Infrastructure) frequency bands. These bands of spectrum are available for anyone to use as long as the transmitting device adheres to a limited set of rules. Thus, the protection offered in most other sections of the RF spectrum to insure limited to no co-channel interferes is not offered in the ISM and UNII bands. Therefore, it is desirable to deploy devices which are robust against co-channel interferers in these bands. This can be accomplished using multi-carrier transmission and especially a form of multi-carrier modulation known as Orthogonal Frequency Division Multiplexing (OFDM). While this modulation method is very spectrally efficient and robust against "very narrow" bandwidth interferers, this is not the case with "narrow" and "medium" bandwidth interferers.

Briefly, OFDM is a special case of Frequency Division Multiplexing (FDM) transmission, where a single data stream is transmitted over a number of lower rate sub-carriers (i.e., multiple, narrowband, carriers are used to transmit information in parallel). OFDM can be viewed as either a modulation technique or a multiplexing technique. All the carriers in an OFDM signal are "mathematically" orthogonal to each other so they do not interfere with each other even though they overlap in frequency. Traditionally, a single carrier has been used to transmit data at a very high data rate, whereas OFDM transmits low speed data on multiple carriers. The result is the same data rate using the same amount of spectrum but OFDM is particularly advantageous in multipath environments and environments with "very narrow" bandwidth interferers.

It should be understood that "very narrow" bandwidth interferers, as described herein, refers to interference signals having a bandwidth which is less than the sub-carrier bandwidth. "Narrow" bandwidth signals are considered wide enough to interfere with approximately 5% of the sub-carriers in the signal. "Medium" bandwidth signals are considered wide enough to interfere with approximately 30% of the sub-carriers in the signal. "Wide" bandwidth signals are considered wide enough to interfere with approximately more than 30% of the sub-carriers in the signal. The above convention is used since OFDM systems vary in the number and bandwidth of sub-carriers. One method to compute the bandwidth of a sub-carrier is to subtract the guard interval time from the symbol time and invert the result. The present invention is particularly suitable where there are at least 10% useable sub-carriers.

OFDM is becoming an increasing popular method for modulation. In this regard, OFDM has been accepted for wireless local area network standards from IEEE 802.11, High Performance Local Area Network type 2 (Hiperlan/2), Mobile Multimedia Access Communication (MMAC) Systems, Digital Audio Broadcasting (DAB), and Digital Video Broadcasting (DVB).

An OFDM symbol is comprised of multiple sub-carriers conveying the data. Each sub-carrier can be modulated using some form of phase and amplitude modulation, including, but not limited to, Binary Phase Shift Keying (BPSK), Quadrature Phase Shift Keying (QPSK), 16 level Quadrature Amplitude Modulation (16QAM), etc. A common feature for each of the above-mentioned modulation techniques is that the data point can be represented as a vector with a phase and magnitude on a complex plane. To recover the transmitted data the following steps are taken:

(1) A waveform is sampled.
(2) A Fast Fourier Transform (FFT) is computed to convert the time domain waveform into a frequency domain representation (the FFT size is matched to the number of sub-carriers).
(3) Each sub-carrier is corrected for distortions caused by the channel.
(4) A decision is made as to which constellation point was sent.
(5) Decoded data is transferred for higher level processing.

It should be understood that modulating a sub-carrier using BPSK results in 1 bit/sub-carrier being communicated, using QPSK 2 bits/sub-carrier are communicated and using 16QAM 4 bits/sub-carrier are communicated.

The above-mentioned interference problem is especially acute due to the unlicensed nature of the ISM bands and UNII bands. RF energy from microwave ovens, RF lighting devices and a variety of wireless local area networks (WLANS) operate in the ISM band. The UNII band is relatively free of interference at the present, but that is expected to change as technology becomes more cost effective for this band. Additional interference can be caused by non-intentional radiators.

The prior art addresses the problem of interference by utilizing one or more of the following techniques: (1) frequency hopping (FH); (2) direct sequence spread spectrum (DSSS); (3) waiting until the interference is gone from the channel; and (4) keep trying to send the data until an error free transmission is received. One drawback to these methods is that they suffer from a significant reduction in data throughput.

The present invention allows an OFDM signal to operate with improved throughput in the presence of "narrow" to "medium" bandwidth interferers which, compared to prior art approaches, would have prevented any information from being exchanged.

SUMMARY OF THE INVENTION

According to the present invention, there is provided a method for selecting sub-carrier frequencies for communication between at least two communication devices using a multi-carrier modulation technique having symbols with associated sub-carrier frequencies, the method comprising the steps of: (a) determining at a first communication device sub-carrier frequencies of the symbols suitable for communication with the first communication device; (b) transmitting data from the first communication device to at least a second communication device indicative of sub-carrier frequencies of the symbols suitable for data communication with the first communication device; (c) determining at a second communication device sub-carrier frequencies of the symbols suitable for communication with the second communication device; and (d) transmitting data from the second communication device to at least the first communication device indicative of sub-carrier frequencies of the symbols suitable for data communication with the first and second communication devices.

According to another aspect of the present invention, there is provided a method for adaptively modifying the modulation of digital data to limit the effects of interference sources in a wireless communications system having a plurality of communication devices, comprising the steps of: (a) sampling the channel at the first communication device; (b) converting the sampled data from the time domain to the frequency domain; (c) analyzing the frequency domain data to determine the frequency of any interferers; (d) determining if there is enough interference free spectrum available to transmit data; (e) generating a data packet (e.g., in the form of a bitmap) representative of the usable sub-carriers for data communication; (f) transmitting the first data packet representing the usable sub-carriers to the second communication device; (g) receiving the first data packet at the second communication device; (h) sampling the channel at the second communication device; (i) converting the sampled data from the time domain to the frequency domain; (j) analyzing the frequency domain data along with the received data packet from the first communication device to determine usable sub-carriers for data communication; (k) generating a new data packet representative of the usable sub-carriers for data communication, or alternatively an acknowledge signal; (l) transmitting the new data packet representative of the usable sub-carriers for data communication (or the acknowledge signal) from the second communication device to the first communication device; and (m) commencing communication between the first communication device and the second communication device.

According to still another aspect of the present invention, there is provided a system for selecting sub-carrier frequencies for communication between at least two communication devices using a multi-carrier modulation technique having symbols with associated sub-carrier frequencies, the system comprising: (a) means for determining at a first communication device sub-carrier frequencies of the symbols suitable for communication with the first communication device; (b) means for transmitting data from the first communication device to at least a second communication device indicative of sub-carrier frequencies of the symbols suitable for data communication with the first communication device; (c) means for determining at a second communication device sub-carrier frequencies of the symbols suitable for communication with the second communication device; and (d) means for transmitting data from the second communication device to at least the first communication device indicative of sub-carrier frequencies of the symbols suitable for data communication with the first and second communication devices.

According to yet another aspect of the present invention, there is provided a system for selecting sub-carrier frequencies for communication between at least two communication devices using a multi-carrier modulation technique having symbols with associated sub-carrier frequencies, the system comprising: (a) a first receiver for receiving communication at a first communication device; (b) a first signal processor for determining at the first communication device sub-carrier frequencies of the symbols suitable for communication with the first communication device; (c) a first transmitter for transmitting data from the first communication device to at least a second communication device indicative of sub-carrier frequencies of the symbols suitable for data communication with the first communication device; (d) a second receiver for receiving communications at a second communication device; (e) a second signal processor for determining at the second communication device sub-carrier frequencies of the symbols suitable for communication with the second communication device; and (f) a second transmitter for transmitting data from the second communication device to at least the first communication device indicative of sub-carrier frequencies of the symbols suitable for data communication with the first and second communication devices.

An advantage of the present invention is the provision of an adaptive control system providing improved interference rejection.

Another advantage of the present invention is the provision of an adaptive control system for interference rejections that provides improved robustness in an environment with "narrow" and "medium" bandwidth interferers.

Still another advantage of the present invention is the provision of an adaptive control system for interference rejection that provides improved data throughput in a communications channel with interference.

Yet another advantage of the present invention is the provision of an adaptive control system for interference rejection that makes wireless communication devices less prone to interference.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 6A is an exemplary OFDM symbol for transmitting bitmap data in a communications system using QPSK modulation; and FIG. 6B is another exemplary OFDM symbol for transmitting bitmap data in a communications system using QPSK modulation.

DETAILED DESCRIPTION OF THE PREFERRED EMBODIMENT

Figure 1:
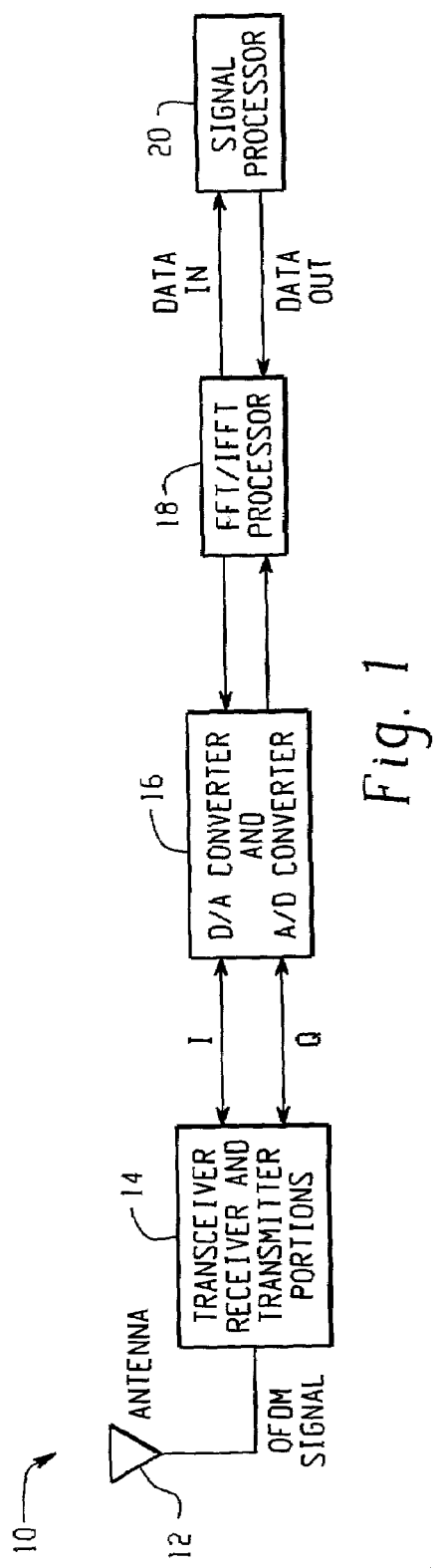
FIG. 1 is a block diagram illustrating an exemplary hardware arrangement for carrying out the present invention.

Referring now to the drawings wherein the showings are for the purposes of illustrating a preferred embodiment of the invention only and not for purposes of limiting same, FIG. 1 illustrates an exemplary hardware arrangement 10 for a wireless communications device using OFDM in connection the present invention. Hardware arrangement 10 is generally comprised of an antenna 12, a transceiver 14, an analog-to-digital (A/D) and digital-to-analog (D/A) converters 16, a Fast Fourier Transform/Inverse Fast Fourier Transform (FFT/IFFT) processor 18, and signal processor 20. Antenna 12 receives RF energy for the receiver portion of transceiver 14 and transmits RF energy for transmitter portion of transceiver 14. Transceiver 14 includes a receiver portion and a transmitter portion. Transceiver 14 also converts the OFDM signal from the transmit or receive carrier frequency down to a lower intermediate frequency or to baseband. The D/A converter converts data being transmitted from digital samples to an analog signal. Likewise, the A/D converter converts data being received from an analog signal to digital samples. The FFT/IFFT processor 18 is used to convert data samples between the time domain and the frequency domain. The samples can be processed in the frequency domain to determine the energy level at each frequency (sub-carrier), as will described in further detail below. Signal processor 20 includes means for sending or receiving data from a host processor (not shown), assigning the data to a sub-carrier, modulating the data on each sub-carrier (e.g., QPSK, QAM, etc.), an energy detector, and a processing means for determining usable sub-carriers, as will be explained in detail below. Signal processor 20 may optionally include other processing elements, such as error correction circuits, data interleavers, clock recovery circuits and/or protocol processors.

It should be appreciated that while a preferred embodiment of the present invention is illustrated in connection with wireless communications devices using OFDM, it is contemplated that the present invention is also suitably used in connection with wireless communication devices using other multi-carrier modulation techniques, including but not limited to frequency division multiplexing (FDM).

Operation of the present invention may be summarized in the following manner. Before a first communication device transmits data to a second communication device, the first communication device samples the RF channel and performs a spectral analysis. This requires no additional hardware for an OFDM radio, since most have a built-in FFT/IFFT processor. The resulting spectrum is analyzed and sub-carriers that use frequencies that have energy above a defined limit are not used to communicate data. This information concerning usable sub-carriers is transmitted by the first communication device to the second communication device by sending a data packet that includes a bitmap indicative of which sub-carriers are usable and unusable by the first communication device. Since no prior information is available on which sub-carriers are usable by the second communication device, the same information must be sent on multiple sub-carriers to the second communication device. The amount of redundancy is predetermined in accordance with system configuration. As the amount of redundancy is increased the system is able to handle more unusable sub-carriers. Accordingly, if the first communication device determines that there are an insufficient number of sub-carriers available to provide sufficient redundancy it will delay transmitting to the second communication device until the channel is more suitable for communication. The second communication device responds to receipt of the data packet (including the bitmap) from the first communication device by sampling the RF energy around its location and determining which sub-carriers are suitable for communicating with the second communication device (i.e., which sub-carriers it can suitably receive data). If the second device determines that all the acceptable sub-carriers for the first communication device are also acceptable to the second communication device, then it may respond with a data packet or an acknowledge without re-transmitting the bit map. If the second communication device needs to modify the useable sub-carriers, then the second device sends a packet to the first communication device with only the modified bit map to the first communication device. If the second communication device determines that there are an insufficient number of sub-carriers available to provide reliable communication, then it will not respond to the frame. If an agreed upon number of sub-carriers is reached, then the first communication device proceeds to send data to the second communication device using only the selected set of sub-carriers.

It should be appreciated that while a preferred embodiment of the present invention described using a wireless communication system having only two communication devices, the present invention is contemplated for use in connection with wireless communication system have more than two communication devices. Therefore, the exchange of data described herein between two communication devices may be extended to an exchange of data between more than two communication devices to identify suitable sub-carriers among a plurality of communication devices. In the case where there are multiple communication devices, only two units will communicate with one another at any given time. Therefore, only the addressed device should respond to the bit map data packet. However, the other devices within the network which can receive the bit map data sent between the two communicating devices can use this information for determining usable sub-carriers for future packet transmission.

Figure 2:
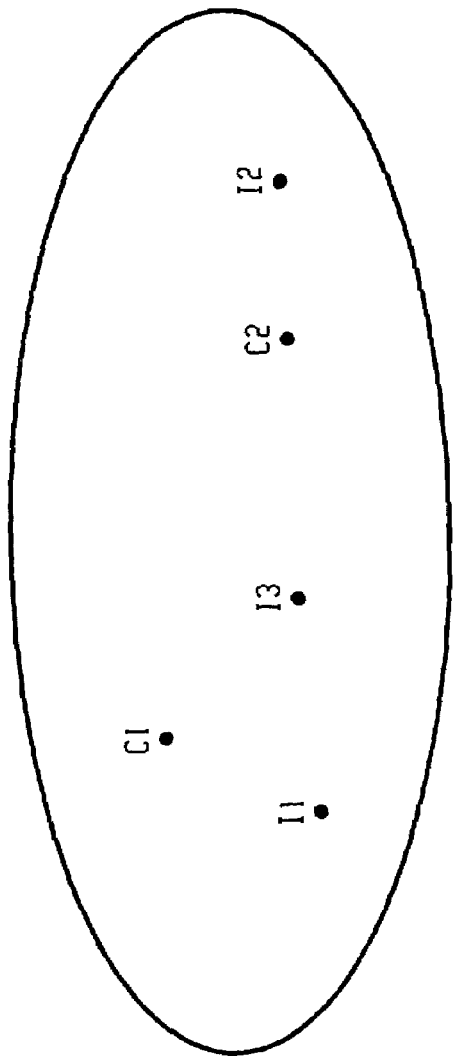
FIG. 2 illustrates an exemplary operating environment for wireless communication devices.

The present invention will now be described in further detail with reference to FIGS. 2–6. FIG. 2 shows an exemplary operating environment for wireless communication devices. A first communication device, C1, and a second communication device, C2, both include hardware arrangement 10. I1, I2 and I3 are interference sources. As can be observed from FIG. 2, some interference sources (i.e., I1) may only be detectable from C1, some interference sources may only be detectable from C2, while still other interference sources (i.e., I3) may be detectable from both C1 and C2.

As indicated above, OFDM is a relatively new modulation technique which uses multiple, narrowband, carriers to transmit information in parallel. All the carriers in an OFDM signal are orthogonal to each other so they not interfere with each other even though they overlap in frequency. Though OFDM is robust in a variety of hostile environments, it still suffers low performance with "medium" bandwidth (defined herein as generally 5% to 30% of a signal's bandwidth) interferers. When such an interferer exists little or no data can be transmitted. It has been observed that not using the sub-carriers in the frequency bands containing the interferers greatly improved throughput.

It has also been considered how to adaptively control which sub-carriers are not used, and coordinate this with multiple units in a wireless communications system, such as a wireless local area network (WLAN) installation. In a typical WLAN installation there are remote nodes known as clients, which communicate with the wired backbone via an access point (AP). There are usually multiple clients which communicate with a given AP and multiple APs in a WLAN environment. When a device such as a client or an AP wishes to transmit a frame of data, it checks the medium to verify that there is no broadband RF energy in the band. Data is transmitted if no broadband RF energy is detected. If RF energy is detected, then the device waits a predetermined period of time before checking the medium again for RF energy.

Figure 3:
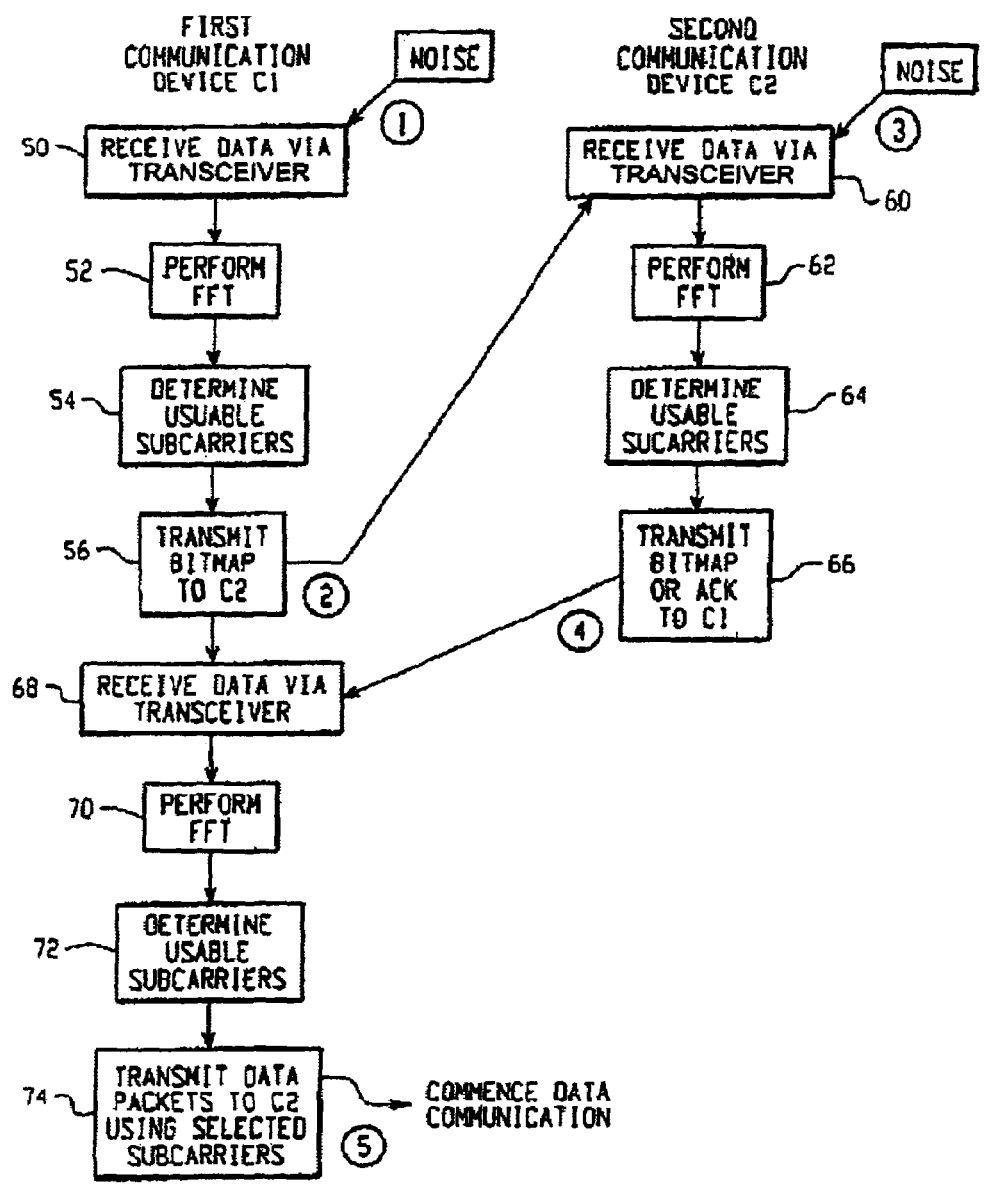
FIG. 3 is a flow diagram illustrating the process of the present invention.

The present invention modifies the process described above, and will now be described with particular reference to the flow diagram shown in FIG. 3. A first communication device C1 desiring to communicate with a second communication device C2 first determines which sub-carriers are unsuitable due to interference in proximity to C1. In this regard, in step 50, C1 tests for interference by sampling the RF channel and receives the data using the transceiver. In step 52, this data is converted to the frequency domain using an FFT algorithm or other suitable spectral analysis algorithms. In step 54, an energy detector and processing means for evaluating the energy level of each sub-carrier are used to determine which sub-carriers are usable (i.e., are not subject to interference). In this regard, the energy levels are analyzed in accordance with a predetermined threshold energy level. Those sub-carriers which have an energy level above the predetermined threshold energy level are determined to be unusable sub-carriers. Thus, C1 will not desire to communicate using these sub-carriers. If C1 deems that not enough sub-carriers are available for reliable communication it will delay transmitting data until C1 detects less interference in the channel or reduces its data rate to make the link more robust.

Figure 4:
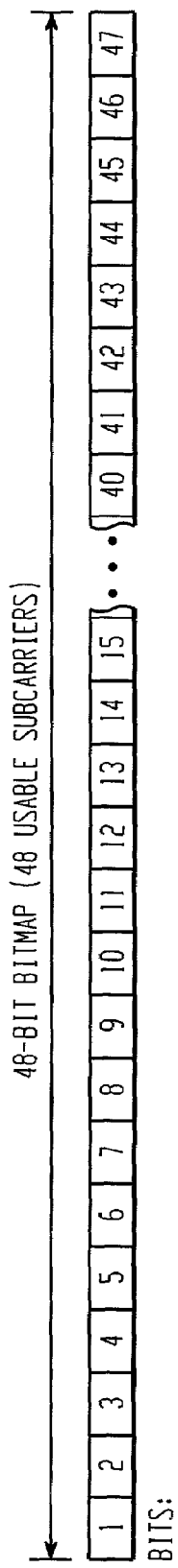
FIG. 4 is an exemplary 48-bit bitmap for use in connection with the present invention.

In accordance with a preferred embodiment of the present invention, a bitmap is generated which is indicative of usable and unusable sub-carriers. For instance, in the case where there are 48 possible sub-carriers, the bitmap is comprised of 48-bits, each bit indicative of whether a respective sub-carrier is usable or unusable (e.g., bit=0=suitable sub-carrier; bit=1=unsuitable sub-carrier). FIG. 4 illustrates a 48-bit bitmap comprised of bits 0 through 47. In step 56, the generated bitmap is transmitted to C2. Since it is unknown to C1 which sub-carriers are unusable to C2 (and thus subject to interference in proximity to C2), the bits comprising the bitmap are transmitted to C2 using a plurality of sub-carriers (including those which may not be suitable for reception by C1, since they may be suitable for reception by C2).

Figure 5A:
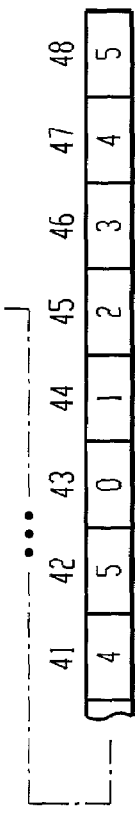
FIG. 5A is an exemplary OFDM symbol for transmitting bitmap data in a communications system using BPSK modulation.
Figure 5A:
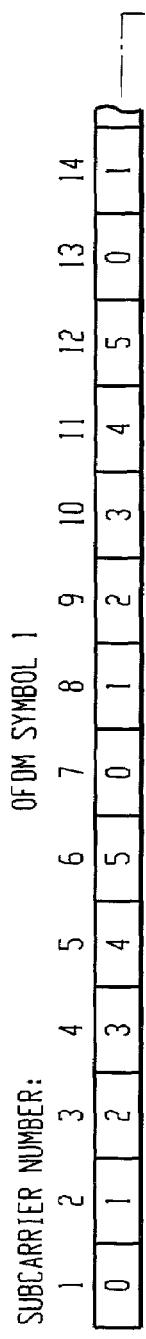
Figure 5B:
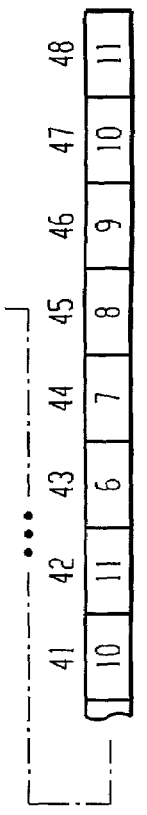
FIG. 5B is another exemplary OFDM symbol for transmitting bitmap data in a communications system using BPSK modulation.
Figure 5B:
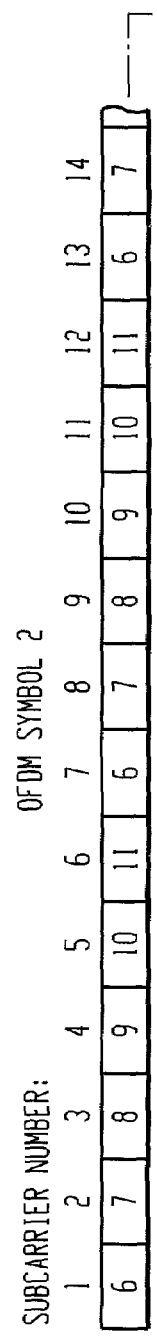

For example, FIGS. 5A and 5B illustrate OFDM signals using BPSK modulation (1 bit/sub-carrier) to redundantly transmit bits of the bitmap using eight different sub-carriers. Accordingly, eight opportunities are provided to send each bit accurately (i.e., without the effects of interference). In should be understood that each OFDM symbol uses all 48 available sub-carriers, and where using BPSK modulation, each sub-carrier communicates 1 bit of the bitmap. In FIG. 5A, the first OFDM symbol is shown which includes bits 0–5 of the bitmap (FIG. 4), each bit repeated eight times, such that eight different carriers will be used to transmit each of these bits from the bitmap. The second OFDM symbol shown in FIG. 5B is used to redundantly transmit bits 6–11 of the bitmap in the same manner as the first OFDM symbol. Six more OFDM symbols are used to redundantly transmit the remaining 36 bits of the bitmap.

Use of other modulation schemes will allow a greater number of bits to be transmitted per carrier. For instance, QPSK modulation allows for 2 bits/sub-carrier, while 16QAM allows for 4 bits/sub-carrier. As a result, each OFDM symbol can transmit greater numbers of bits using the same number of sub-carriers. FIGS. 6A and 6B illustrate OFDM symbols used with QPSK modulation. As can be observed, the number of bits per sub-carrier has doubled as compared to BPSK modulation, resulting in greater redundancy.

It should be appreciated that the size of the bitmap, the amount of redundancy, and the modulation scheme are appropriately selected in accordance with a particular application. For instance, environments with greater amounts of interference may necessitate the use of higher redundancy. The bitmap size, amount of redundancy and modulation schemes described herein are exemplary to illustrate a preferred embodiment of the present invention, and are not intended to limit same.

Returning now to FIG. 3, C2 will receive the bitmap and analyze the received data to identify which of the sub-carriers is unsuitable for C1 (step 60). In addition, C2 analyzes its own noise conditions to determine which sub-carriers are unsuitable due to interference in proximity to C2 (steps 60–64). A new bitmap is generated which is indicative of which sub-carriers are suitable and unsuitable for both C1 and C2 (step 66). If the new bitmap is identical to the one received by C2, then only an acknowledge signal needs to be sent to C1 using the agreed upon set of sub-carriers (step 66). If a different bitmap is generated, it is then transmitted by C2 to C1 in the same manner as the first bitmap was transmitted from C1 to C2, as described above. In this regard, the two devices have agreed on which sub-carriers to use for communication based on the interference detected at both devices. As indicated above, some of the sub-carriers that are suitable for communication with C1 may have been unsuitable for communication with C2, due to interference in proximity to C2. C1 uses the modified bitmap it received from C2 to identify which sub-carriers to communicate with C2 (steps 68–72), and can thus commence a data transmission to C2 (step 74).

It should be appreciated that the foregoing exchange of bitmaps may be repeated as necessitated by a particular communications environment. For instance, a check of suitable sub-carriers may be needed more often in the case of an environment with frequent changes in noise conditions. Moreover, a check of suitable sub-carriers may be done before each frame of data is transmitted, or when an error condition arises (e.g., an acknowledge is not received).

It should be further appreciated that error correction schemes, including, but not limited to convolutional codes, block codes, or turbo codes, may also be suitably used in connection with transmission of data in accordance with the present invention.

Furthermore, while the present invention has been described in connection with the use of bitmaps to exchange data concerning suitable and unsuitable sub-carriers, it is contemplated that other suitable methods may be used, including but not limited to: explicit lists of unusable sub-carriers, explicit lists of usable sub-carriers, or a list of unusable sub-carriers formed by the first unusable sub-carrier followed by the number of unusable sub-carriers after that. Moreover, in the data exchange between communication devices, the data may only identify the unsuitable sub-carriers (thus implying the suitable sub-carriers), may only identify the unsuitable sub-carriers (thus implying the unsuitable sub-carriers), or identify both suitable and unsuitable sub-carriers.

The present invention addresses the drawbacks of the prior art to provide a system for identifying which sub-carriers in a multi-carrier system are located on frequencies that have interfering signals, and using only those sub-carriers that are not subject to interference for communications between wireless communications devices.

The invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

What is claimed is:

1. A method for selecting sub-carrier frequencies for communication between at least two communication devices using a multi-carrier modulation technique with associated sub-carrier frequencies, the method comprising the steps of:
   determining at a first communication device sub-carrier frequencies suitable for communication with the first communication device through testing for interference by sampling a radio frequency channel;
   transmitting data from the first communication device to at least a second communication device wherein the data is indicative of sub-carrier frequencies suitable for data communication with the first communication device;
   determining at a second communication device sub-carrier frequencies suitable for communication with the second communication device through testing for interference by sampling the radio frequency channel; and
   transmitting data from the second communication device to at least the first communication device wherein the data is indicative of sub-carrier frequencies suitable for data communication with the first and second communication devices.

2. A method according to claim 1, wherein said method further comprises:
   commencing data communication from the first communication device to at least the second communication device using the sub-carrier frequencies, in accordance with the data received from the second communication devices.

3. A method according to claim 1, wherein said data indicative of sub-carrier frequencies suitable for data communication with the first communication device includes a bitmap.

4. A method according to claim 1, wherein said data indicative of sub-carrier frequencies suitable for data communication with the first and second communication devices includes a bitmap.

5. A method according to claim 1, wherein said data indicative of sub-carrier frequencies suitable for data communication with the first communication device is transmitted redundantly to the second communication device using a plurality of sub-carriers.

6. A method according to claim 1, wherein said data indicative of sub-carrier frequencies suitable for data communication with the first and second communication devices is transmitted redundantly to the first communication device using a plurality of su-carriers.

7. A method according to claim 1, wherein said step of determining at a first communication device sub-carrier frequencies suitable for communication with the first communication device, includes spectrum analysis to evaluate energy levels.

8. A method according to claim 1, wherein said step of determining at a second communication device sub-carrier frequencies suitable for communication with the second communication device, includes spectrum analysis to evaluate energy levels.

9. A method according to claim 1, wherein said multi-carrier modulation technique uses sub-carriers which are orthogonal to each other.

10. A method according to claim 1, wherein said step of transmitting data from the second communication device to at least the first communication device wherein the data is indicative of sub-carrier frequencies suitable for data communication with the first and second communication devices, includes the step of transmitting an acknowledge signal to indicate sub-carrier frequencies suitable for data communication with the first and second communication devices.

11. A system for selecting sub-carrier frequencies for communication between at least two communication devices using a multi-carrier modulation technique with associated sub-carrier frequencies, the system comprising:
   means for determining at a first communication device sub-carrier frequencies suitable for communication with the first communication device through testing for interference by sampling a radio frequency channel;
   means for transmitting data from the first communication device to at least a second communication device wherein the data is indicative of sub-carrier frequencies suitable for data communication with the first communication device;
   means for determining at a second communication device sub-carrier frequencies suitable for communication with the second communication device through testing for interference by sampling the radio frequency channel; and
   means for transmitting data from the second communication device to at least the first communication device wherein the data is indicative of sub-carrier frequencies suitable for data communication with the first and second communication devices.

12. A system according to claim 11, wherein said system further comprises:
   means for commencing data communication from the first communication device to at least the second communication device using the sub-carrier frequencies, in accordance with the data received from the second communication device.

13. A system according to claim 11, wherein said data indicative of sub-carrier frequencies suitable for data communication with the fist communication device includes a bitmap.

14. A system according to claim 11, wherein said data indicative of sub-carrier frequencies suitable for data communication with the first and second communication devices includes a bitmap.

15. A system according to claim 11, wherein said data indicative of sub-carrier frequencies suitable for data communication with the first communication device is transmitted redundantly to the second communication device using a plurality of sub-carriers.

16. A system according to claim 11, wherein said data indicative of sub-carrier frequencies suitable for data communication with the first and second communication devices is transmitted redundantly to the first communication device using a plurality of sub-carriers.

17. A system according to claim 11, wherein said means for determining at a first communication device sub-carrier frequencies suitable for communication with the first communication device, includes means for performing a spectrum analysis to evaluate energy levels.

18. A system according to claim 11, wherein said means for determining at a second communication device subcarrier frequencies suitable for communication with the second communication device, includes means for performing spectrum analysis to evaluate energy levels.

19. A system according to claim 11, wherein said multi-carrier modulation technique uses sub-carriers which are orthogonal to each other.

20. A system according to claim 11, wherein said data indicative of sub-carrier frequencies suitable for data communication with the first and second communication devices is an acknowledge signal.

21. A system for selecting sub-carrier frequencies for communication between at least two communication devices using a multi-carrier modulation technique with associated sub-carrier frequencies, the system comprising:
   a first receiver for receiving communication at a first communication device;
   a first signal processor for determining at the first communication device sub-carrier frequencies suitable for communication with the first communication device;
   the first receiver and the first processor configured for determining sub-carrier frequencies suitable for communication with the first communication device through testing for interference by sampling a radio frequency channel;
   a first transmitter for transmitting data from the first communication device to at least a second communication device wherein the data is indicative of sub-carrier frequencies suitable for data communication with the first communication device;
   a second receiver for receiving communications at a second communication device;
   a second signal processor for determining at the second communication device sub-carrier frequencies suitable for communication with the second communication device;
   the second receiver and the second processor configured for determining sub-carrier frequencies suitable for communication with the second communication device through testing for interference by sampling the radio frequency channel; and
   a second transmitter for transmitting data from the second communication device to at least the first communication device wherein the data is indicative of sub-carrier frequencies suitable for data communication with the first and second communication devices.

22. A system according to claim 21, wherein the first transmitter commences data communication from the first communication device to at least the second communication device using the sub-carrier frequencies, in accordance with the data received from the second communication device.

23. A system according to claim 21, wherein said data indicative of sub-carrier frequencies suitable for data communication with the first communication device includes a bitmap.

24. A system according to claim 21, wherein said data indicative of sub-carrier frequencies suitable for data communication with the first and second communication devices includes a bitmap.

25. A system according to claim 21, wherein said data indicative of sub-carrier frequencies suitable for data communication with the first communication device is transmitted redundantly to the second communication device using a plurality of sub-carriers.

26. A system according to claim 21, wherein said data indicative of sub-carrier frequencies suitable for data communication with the first and second communication devices is transmitted redundantly to the first communication device using a plurality of sub-carriers.

27. A system according to claim 21, wherein said system further comprises a first spectrum analyzer to evaluate energy levels at the first communication device.

28. A system according to claim 21, wherein said system further comprises a second spectrum analyzer to evaluate energy levels at the second communication device.

29. A system according to claim 21, wherein said multi-carrier modulation technique uses sub-carriers which are orthogonal to each other.

30. A system according to claim 21, wherein said second transmitter transmits an acknowledge signal to indicate sub-carrier frequencies suitable for data communication with the first and second communication devices.

31. A method for selecting sub-carrier frequencies for communication between at least two communication devices using a multi-carrier modulation technique with associated sub-carrier frequencies, the method comprising the steps of:
   determining at a first communication device sub-carrier frequencies suitable for communication with the first communication device through testing for interference by sampling a radio frequency channel; and
   transmitting data from the first communication device to at least a second communication device wherein the data is indicative of sub-carrier frequencies suitable for data communication with the first communication device.

32. The method of claim 31, the determining step further comprising:
   converting sampled data to the frequency domain; and
   evaluating energy levels of each sub-carrier frequency;
   wherein any sub-carrier frequency having an energy level above a predetermined threshold is determined to be an unusable frequency.

33. A method for selecting sub-carrier frequencies for communication between at least two communication devices using a multi-carrier modulation technique with associated sub-carrier frequencies, the method comprising the steps of:
   receiving data at a second communication device, wherein said data is indicative of sub-carrier frequencies suitable for data communication with at least a first communication device;
   determining at the second communication device sub-carrier frequencies suitable for communication with the second communication device through testing for interference by sampling a radio frequency channel; and
   transmitting data from the second communication device to at least the first communication device wherein the data is indicative of sub-carrier frequencies suitable for data communication with at least the first and second communication devices.

34. A method according to claim 33, wherein said method further comprises:
   commencing data communication from the first communication device to at least the second communication device using the sub-carrier frequencies, in accordance with the data received from the second communication device.

35. A system for selecting sub-carrier frequencies for communication between at least two communication devices using a multi-carrier modulation technique with associated sub-carrier frequencies, the system comprising:
   means for determining at a first communication device sub-carrier frequencies suitable for communication with the first communication device through testing for interference by sampling a radio frequency channel; and means for transmitting data from the first communication device to at least a second communication device wherein the data is indicative of sub-carrier frequencies suitable for data communication with the first communication device.

36. A system for selecting sub-carrier frequencies for communication between at least two communication devices using a multi-carrier modulation technique with associated sub-carrier frequencies, the system comprising:

means for receiving data at a second communication device, wherein said data is indicative of sub-carrier frequencies suitable for data communication with at least a first communication device;

means for determining at the second communication device sub-carrier frequencies suitable for communication with the second communication device through testing for interference by sampling a radio frequency channel; and means for transmitting data from the second communication device to at least the first communication device wherein the data is indicative of sub-carrier frequencies suitable for data communication with at least the first and second communication devices.

37. A system according to claim 36, wherein said system further comprises:

means for commencing data communication from the first communication device to at least the second communication device using the sub-carrier frequencies, in accordance with the data received from the second communication device.

38. A system for selecting sub-carrier frequencies for communication between at least two communication devices using a multi-carrier modulation technique with associated sub-carrier frequencies, the system comprising:

a first receiver for receiving communication at a first communication device;

a first signal processor for determining at the first communication device sub-carrier frequencies suitable for communication with the first communication device through testing for interference by sampling a radio frequency channel; and a first transmitter for transmitting data from the first communication device to at least a second communication device wherein the data is indicative of sub-carrier frequencies suitable for data communication with the first communication device.

39. A system according to claim 38, wherein said system further comprises:

a second receiver for receiving communications at a second communication device;

a second signal processor for determining at the second communication device sub-carrier frequencies suitable for communication with the second communication device; and a second transmitter for transmitting data from the second communication device to at least the first communication device indicative of sub-carrier frequencies suitable for data communication with at least the first and second communication devices.

40. A system for selecting sub-carrier frequencies for communication between at least two communication devices using a multi-carrier modulation technique with associated sub-carrier frequencies, the system comprising:

a second receiver for receiving communications at a second communication device, wherein said communication includes data indicative of sub-carrier frequencies suitable for data communication with at least a first communication device;

a second signal processor for determining at the second communication device sub-carrier frequencies suitable for communication with the second communication device through testing for interference by sampling a radio frequency channel; and a second transmitter for transmitting data from the second communication device to at least the first communication device wherein the data is indicative of sub-carrier frequencies suitable for data communication with at least the first and second communication devices.

* * * * *